United States Patent [19]

Provi

[11] 3,889,353
[45] June 17, 1975

[54] METHOD OF MAKING A COMPOSITE METAL AND PLASTIC LEVEL

[75] Inventor: Mike A. Provi, Rockford, Ill.

[73] Assignee: Pro Products, Inc., Rockford, Ill.

[22] Filed: May 31, 1974

[21] Appl. No.: 474,936

Related U.S. Application Data

[63] Continuation-in-part of Ser. No. 363,978, May 25, 1973, abandoned.

[52] U.S. Cl. ............... 29/458; 33/381; 29/460; 29/527.1; 264/41; 264/275; 264/274
[51] Int. Cl. .................. B23p 3/00; B23p 25/00
[58] Field of Search .......... 29/458, 460; 264/275 X, 264/274 X, 277, 41; 33/112, 379, 381 X

[56] References Cited
UNITED STATES PATENTS

| | | | |
|---|---|---|---|
| 3,029,524 | 4/1962 | Vaida et al. | 33/381 |
| 3,302,276 | 2/1967 | Williams et al. | 29/460 X |
| 3,470,598 | 10/1969 | Berthelsen | 29/458 X |
| 3,513,558 | 5/1970 | Kuchta et al. | 33/381 |
| 3,597,831 | 8/1971 | Caplan | 29/460 |
| 3,725,995 | 4/1973 | Sharp | 29/458 X |

FOREIGN PATENTS OR APPLICATIONS

| | | | |
|---|---|---|---|
| 1,913,336 | 10/1969 | Germany | 33/112 |

*Primary Examiner*—Charlie T. Moon
*Attorney, Agent, or Firm*—Morsbach & Pillote

[57] ABSTRACT

A method and apparatus for making a level with a composite metal and plastic body. A metal frame is provided with four relatively parallel rails arranged in a transversely rectangular array and an internal metal web structure rigidly interconnecting the rails and forming channels along the side of the array. Mold means having resilient mold surfaces are pressed against the outer faces of the rails to close the outer sides of the channels and a rigid urethane foam reaction mixture is introduced into the channels and allowed to set to form a rigid foamed plastic body on the frame. Level vials are mounted on the level body either by attachment to the metal frame before the plastic molding operation or by mounting on the level body after the plastic molding operation.

15 Claims, 19 Drawing Figures

PATENTED JUN 17 1975  3,889,353
SHEET 1
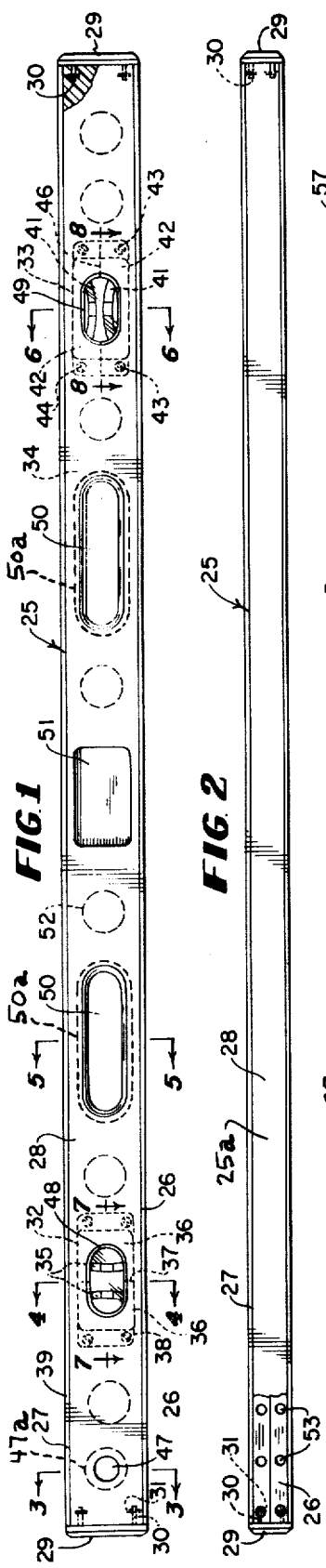
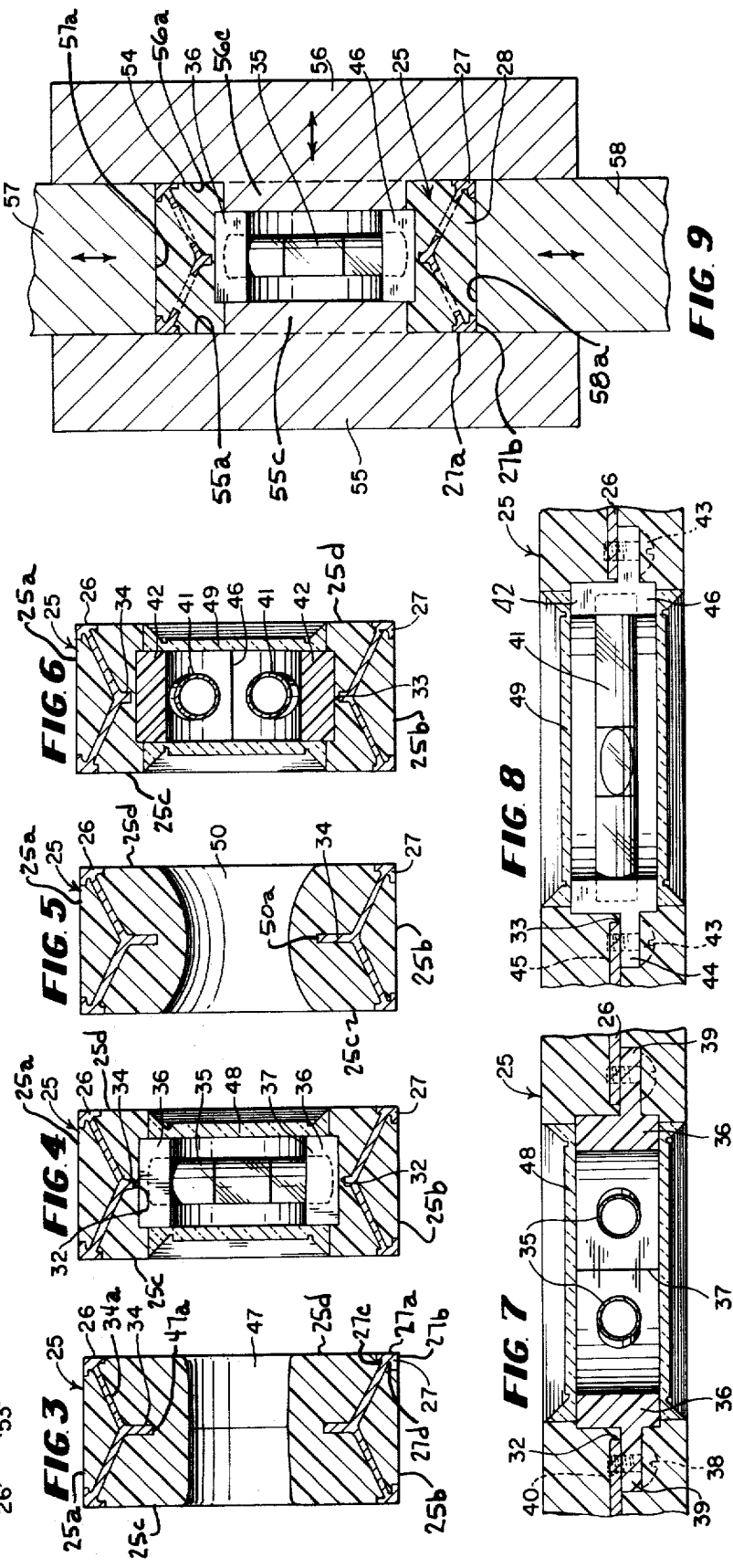

PATENTED JUN 17 1975 3,889,353
SHEET 2
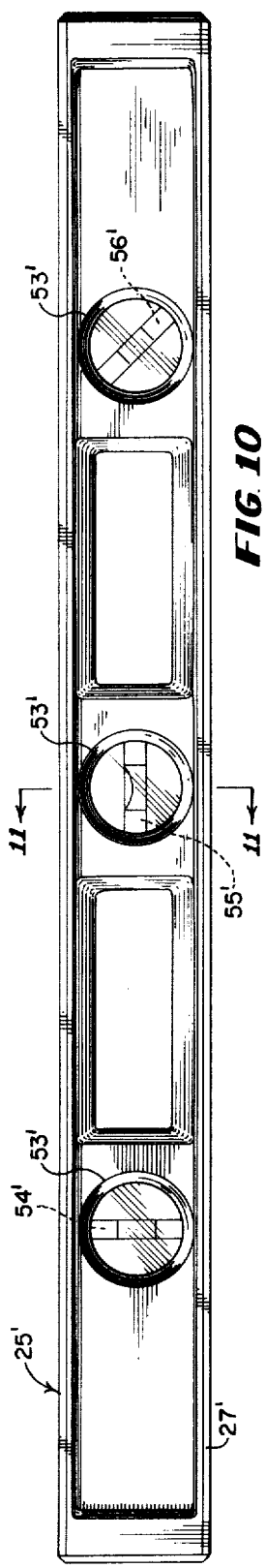
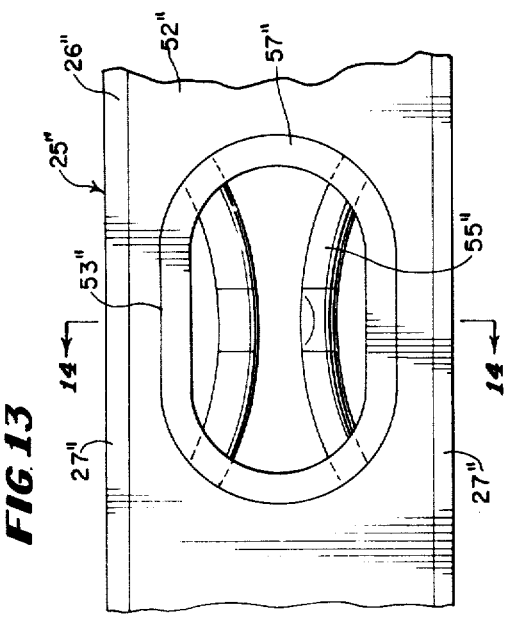
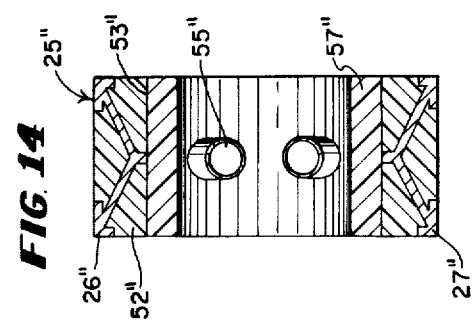
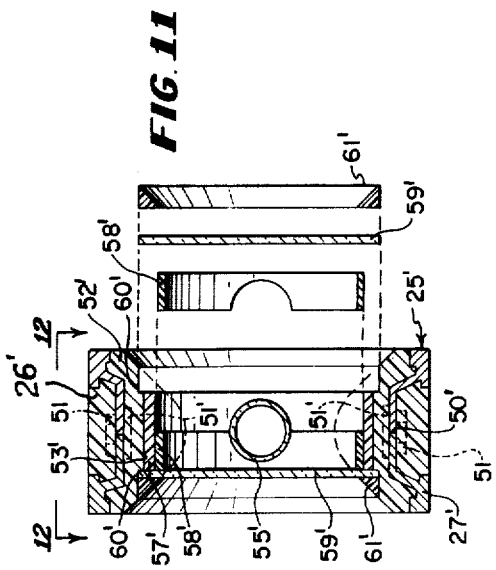

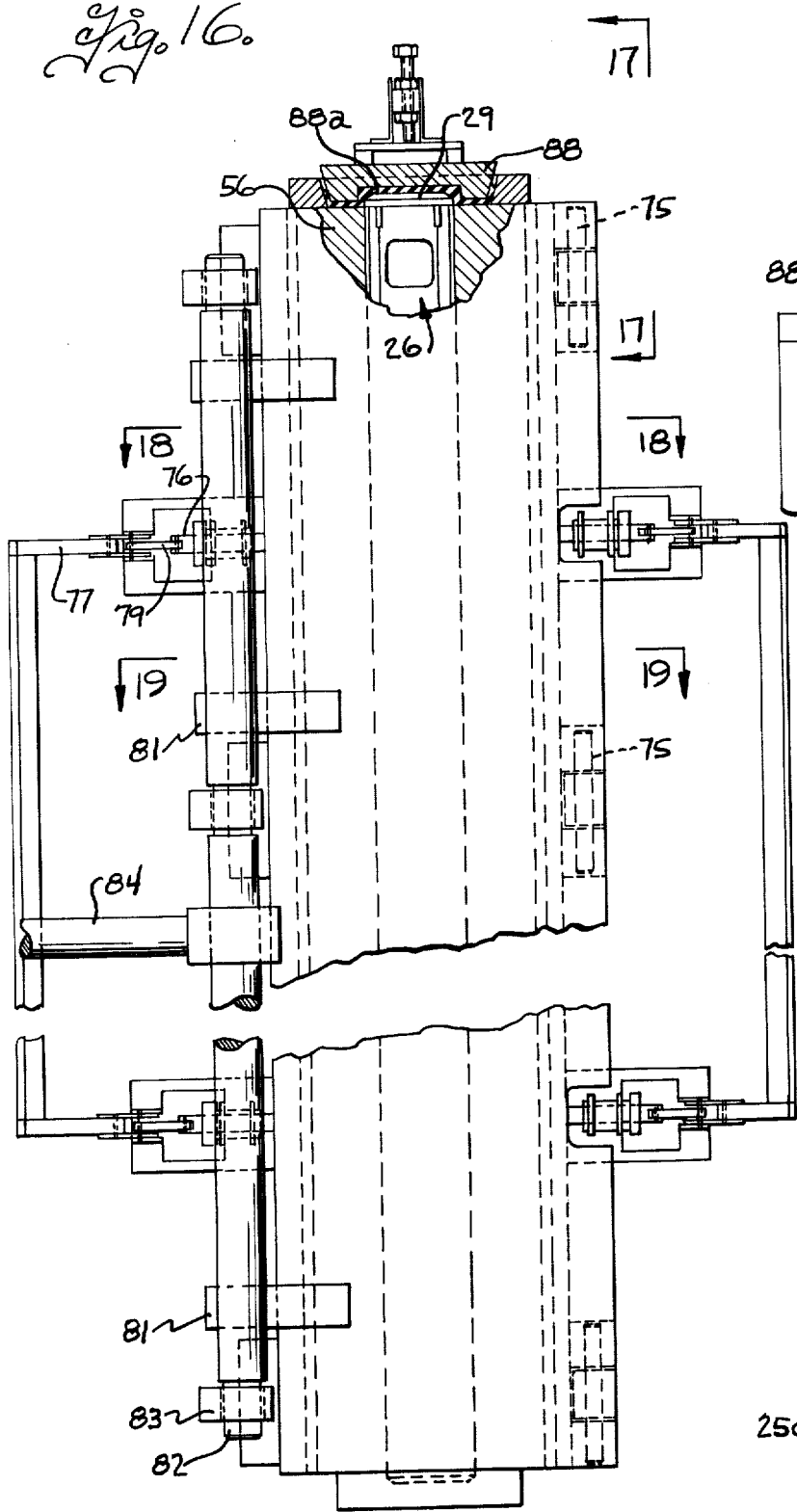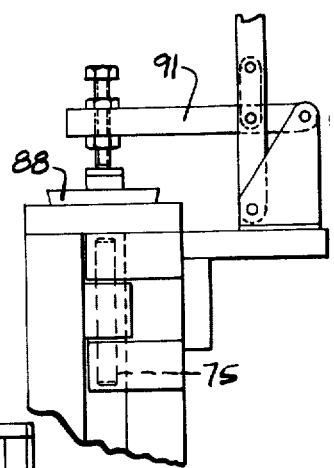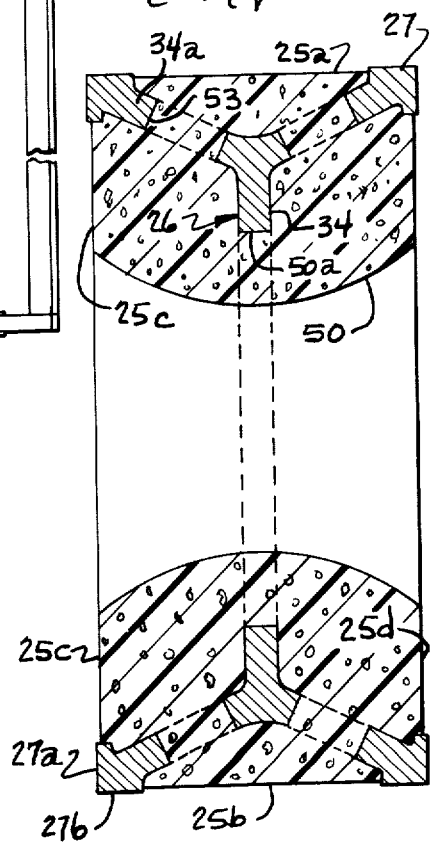

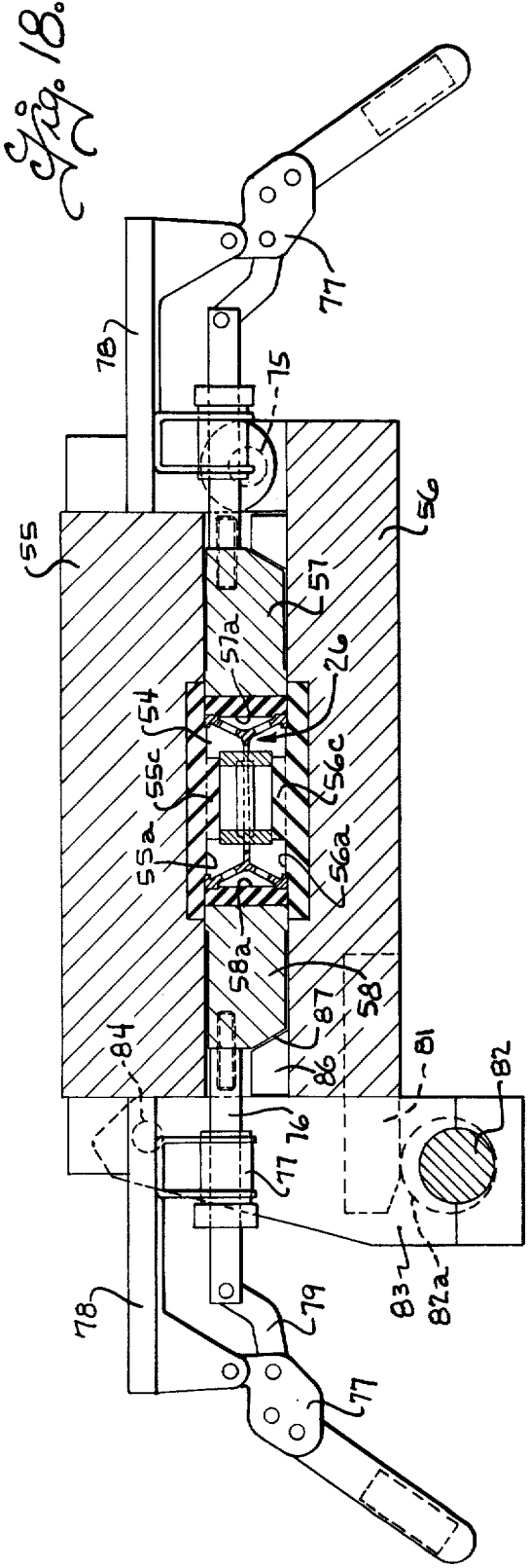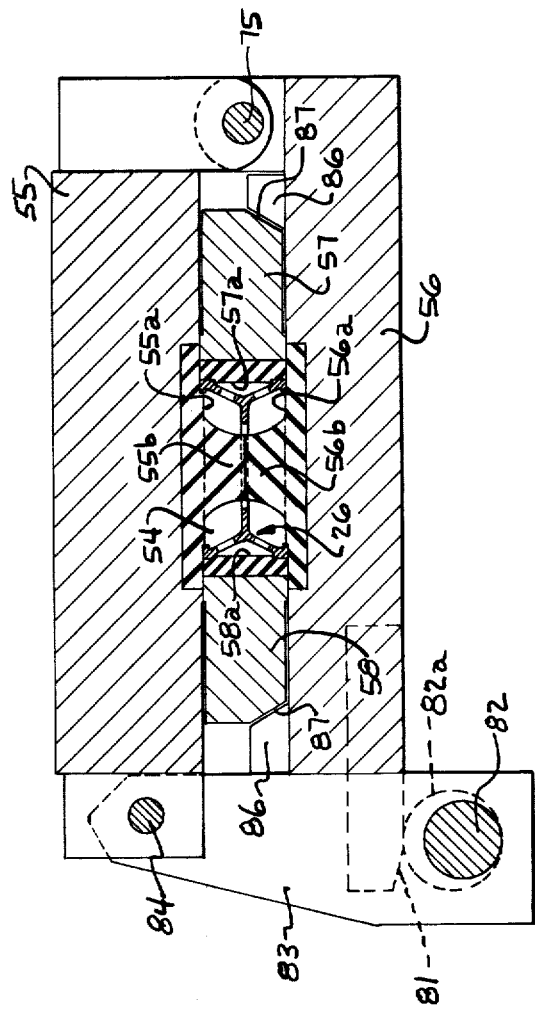

METHOD OF MAKING A COMPOSITE METAL AND PLASTIC LEVEL

This is a continuation-in-part of my copending application for Carpenters and Masons Level, Ser. No. 363,978, filed May 25, 1973, now abandoned.

BACKGROUND

Carpenter's and mason's levels are made with relatively long level bodies, usually in a range from about two to four feet in length, with some level bodies even longer. The level bodies must have work engaging faces that define a planar work engaging surface and the level bodies must be capable of retaining a planar work engaging surface under the impacts and stresses encountered in normal use. Moreover, since the carpenter's and mason's levels are handled manually and must be lifted into and out of engagement with the work being leveled many times in a normal work day, it is very important that the overall weight of the level be kept as low as possible consistent with maintaining adequate strength and rigidity.

It has been the common practice for many years to make carpenter's and mason's levels almost entirely from wood, with the level vials set in openings in the wood body. Wood has a density of only about 35 to 40 pounds per cubic foot and level bodies formed of wood are generally considered to have desirable characteristics in that they are relatively light in weight, comfortable to handle even in cold weather, and resist deformation of the work engaging surface under the impacts and stresses encountered in normal use. However, wood does absorb moisture and is subject to warping. Further, wood does not have good abrasion resistance and metal wear strips were sometimes affixed to the corners of wood levels to reduce wear on the work engaging faces of the wood level. Moreover, wood levels are quite expensive to make. High quality wood is becoming more difficult and expensive to obtain and the manufacture of the wood levels requires many operations in drying the wood and machining the wood to form an accurate level body.

Levels have also been made with all metal bodies, usually of aluminum with an I-beam configuration and with the level vials mounted on the web portion of the I-beam. However, aluminum has a density more than four times that of wood used in making all wood levels and it was accordingly necessary to use relatively thin webs and flanges in such metal level bodies to keep the overall weight within acceptable limits. The flanges on such all metal levels were exposed and unsupported at their outer edges and even a moderate blow on one of the flanges that only produced a slight bending of the flange could cause a serious deformation of the work engaging surface. Further, all metal levels were not as comfortable to handle as wood levels. The I-beam configuration presented relatively sharp corners and the high thermal conductivity of the metal made the levels cold and uncomfortable to handle in cold weather.

SUMMARY OF THE INVENTION

It is the object of the present invention to overcome the disadvantages of the prior levels by providing a method for producing a carpenter's and mason's level having a composite metal and plastic body in which a metal frame is formed with rails defining accurate level surfaces and the plastic body is molded on the metal frame leaving the outer faces of the rails exposed to provide accurate level surfaces.

Accordingly, the present invention provides a method for producing a carpenter's and mason's level in which a metal frame is provided having four relatively parallel rails arranged in a transversely rectangular array and an internal metal web structure interconnecting the four rails and defining a channel along each side of the array. Mold members are pressed against the outer faces of the rails to close the outer sides of the channels and a flowable plastic material of a type hardenable into a rigid plastic body is introduced into the channels and allowed to set to form a composite metal and plastic level body in which the outer faces of the rails are exposed to provide accurate work engaging surfaces. The metal frame thus controls the position of the mold members when they are closed so that the frame determines the size of the mold cavity and the relative parallelism of the level body forming surfaces on the mold members during the molding operation. Moreover, the mold members seal the outer faces of the rails from the mold cavity so that the outer faces of the rails are exposed to provide accuracy on the composite metal and plastic level body.

The mold members are formed with resilient mold surfaces and are pressed against the rails with sufficient pressure to compress the portions of the mold surfaces that engage the rails and offset the intermediate portions of the mold surfaces inwardly of the outer faces of the rails whereby the outer faces of the plastic on the composite metal and plastic level body will similarly be offset inwardly of the outer faces of the rails. The flowable plastic material is preferably a charge of rigid urethane foam reaction mixture having a free rise volume greater than the volume of the channels in the frame so that, upon expansion and setting of the reaction mixture, the outer surface of the foamed plastic body is compressed to a relatively dense and essentially noncellular skin. The density of the plastic is preferably in a range of about 20 to 30 pounds per cubic foot and such that the overall weight of the composite metal and plastic level body is no more and preferably less than that of the wood level of comparable size.

The internal web structure of the metal frame is provided with openings along its length to allow free flow of the plastic material between the channels during molding. The internal web structure is also provided with enlarged openings to accommodate the level vials and level vials can be mounted on the frame in the enlarged openings before molding the plastic body on the frame or the level vials can be mounted on the level body after molding the plastic body on the metal frame, in openings cored or otherwise formed in the plastic body. Resilient end caps are advantageously positioned on the ends of the frame during the molding operation to be molded integral with the plastic body during molding of the latter.

The invention is illustrated in the accompany drawings, in which:

FIG. 1 is a side view of a carpenter's and mason's level made in accordance with my invention;

FIG. 2 is an edge view of FIG. 1 with a portion of the molded urethane body broken away at one end to reveal a portion of the perforated aluminum extrusion and also show how the end cap is secured;

FIGS. 3, 4, 5 and 6 are vertical sections on the correspondingly numberd lines of FIG. 1;

FIGS. 7 and 8 are horizontal sections on the correspondingly numbered lines of FIG. 1, showing the vial holders with their screw threaded mountings;

FIG. 9 is a section through the upper and lower parts of the mold between which the cavity that is filled with the urethane is defined;

FIG. 10 is a side view of another embodiment of a carpenter's level made in accordance with my invention, wherein the vials and vial holders are assembled in the level after molding of the body of urethane or other foamed plastic material;

FIG. 11 is a section on the line 11—11 of FIG. 10, showing parts on one side in disassembled relationship to the level to better illustrate the mode of assembly;

FIG. 12 is a detail on the line 12—12 of FIG. 11, showing how a two-part frame is held assembled with sheet-metal tie plates with a twist bar;

FIGS. 13 and 14 are lated views of another construction similar to FIG. 11, FIG. 14 being a section on the line 14—14 of FIG. 13;

FIG. 15 is a transverse sectional view through a composite metal and plastic level body having a metal frame similar to the frame in FIGS. 1–9, and with the outer faces of the plastic body offset inwardly of the outer faces of the rails;

FIG. 16 is a side elevational view of a mold apparatus for use in making a composite metal and plastic level according to my invention, with parts broken away and shown in section to illustrate details of construction;

FIG. 17 is a fragmentary edge elevational view of the mold apparatus taken on the plane 17—17 of FIG. 16;

FIG. 18 is a transverse sectional view through the mold apparatus taken on the plane 18—18 of FIG. 16; and FIG. 19 is a transverse sectional view through the mold apparatus taken on the plane 19—19 of FIG. 16.

Similar reference numerals are applied to corresponding parts throughout the views.

Referring first to the embodiment of FIGS. 1–8, the reference numeral 25 designates a carpenter's level having relatively parallel work engaging edge faces 25a, 25b and opposed relatively parallel side faces 25c, 25d. The level in general includes a metal frame 26 and a plastic body 28 molded on the frame. The metal frame 26 in the form of an aluminum extrusion, which has four straight and accurately parallel rails at the four corners of a rectangular array and an internal metal web structure interconnecting the four rails and defining a channel at each side of the rectangular array. The rails provide four sharply defined right angle longitudinal corners for the level body and define accurately parallel work engaging surfaces. The internal web structure includes a central web 34 and four lengthwise extending flanges 34a that extend from the central web to a respective rail 27. The body 28 of the level is molded on this frame of rigid foamed plastic material with sections of the plastic body substantially filling the channels at each of the four sides of the array to form a level body of generally rectangular cross section. The plastic body is preferably formed of high density rigid urethane foam and the density is preferably made somewhat less than the density of wood, in a range of about 20 to 30 pounds per cubic foot, so that the overall weight of the composite metal and plastic body is about the same or even slightly less than that of a wood level of like size. The foamed plastic body is also preferably formed with an essentially non-porous or non-cellular skin, commonly referred to as integral skin rigid foam, so as to minimize adhesion of dirt and building materials such as cement and mortar to outer surfaces of the plastic on the level body. Such high density rigid urethane foam has good adhesion to the metal frame, good dimensional stability at both elevated and low temperatures, high thermal insulation value, high compressive strength and low water adsorption. The outer faces of the plastic are advantageously formed so as to be offset inwardly from the outer faces of the rails as best shown in FIG. 15, a slight distance of the order of 0.001 to 0.003 inches, so that any irregularities in the plastic body do not interfere with the level surfaces defined by the rails. Moreover, with this arrangement, the plastic faces are not in rubbing contact with the surface being leveled and are not abraded thereby. The outer surfaces are preferably textured and stained to simulate wood.

Molded end caps 29 of rubber or the like are advantageously molded integral with the plastic body 28 by being set in the opposite ends of the mold cavity at the outset of the molding operation so that the pins 30 that are molded integral with the caps can be anchored in the body of the level by metallic fasteners that require spreading to receive the pins 30. Rectangular holes 32 and 33 are provided in the central web 34 of the frame to receive level vials. Two level vials 35 are assembled in the hole 32 and are vertically disposed in holders 36 that have abutment on a transverse meeting line 37, the two holders being separately fastened by self-tapping screws 38, which extend through holes in lugs 39 on the holders and thread in holes 40 provided in the web, very little adjustment of the screws 38 sufficing to set the vials 35 very accurately and hold the same in accurately adjusted position preliminary to the urethane molding operation that defines the body 28 of the level. Another pair of vials 41 that are horizontally disposed in holders 42 are mounted in the other opening 33 are similarly fastened and adjusted by means of self-tapping screws 43 extending through holes in lug 44 on the holders and threaded in registering holes 45 provided in the web of the extrusion 26. In the case of the holders 42, they are separated along a horizontal line 46. As best shown in FIGS. 4, 6, 7 and 8, the plastic holders 36 and 42 define an annular frame of a size somewhat smaller than the respective openings 32 and 33 in the web 34 of the frame and the plastic body 28 extends through the openings 32 and 33 aroung the holders and interconnects the plastic in the channels along opposite sides of the body. Windows 48 and 49 of glass or clear plastic engage opposite ends of the plastic holders and provide good protection, as well as visibility, for the level vials 35 and 41, respectively.

A through-hole 47 is provided in one end of the level for hanging it up and to some extent as a convenience in carrying it and the through-hole 47 registers with and is somewhat smaller than an opening 47a in the frame. One or more elongated hand-holes are provided at 50 near the middle of the length of the level and the hand holes 50 also register with and are smaller than corresponding elongated openings 50a in the web of the metal frame. Thus, the channels at opposite sides of the level body are interconnected through openings 47a and 50a in the central web 34, as shown in FIGS. 3 and 5, as well as through openings 32 and 33 in the web 34. At regularly spaced intervals, additional large holes 52 can be provided in the web 34 of the frame 26 for free flow of the liquid urethane or other foamed plastic in the molding of the body of the level, and a much larger number of smaller holes 53 are distributed along the flange portions 34a of the frame 26 for the same purpose. Thus, the channels at the four sides of the body are interconnected for free flow of the plastic material from one channel to an adjacent channel during molding of the plastic on the frame and, after hardening, the sections of plastic in the channels are interconnected through the openings in the frame into a rigid unitary plastic body. As will be seen from FIGS. 3–6, the rails 27 define outer faces 27a, 27b at right angles to each other and grooves 27c, 27d at their juncture with the flanges 34a, which grooves undercut the outer faces 27a, 27b respectively and open into the adjacent channels. The plastic in the channels fills the undercut grooves and is thus mechanically keyed to the frame. A recess 51 is provided in the side of the level body to receive a name plate.

In making the levels of the embodiment of FIGS. 1–8, preliminary molded assemblies are made of the vials 35 and 41 in their holders 36 and 42, and then the holders 36 and 42 are mounted on the metal frame by means of the self-tapping screws 38 and 43, respectively, in the holes 40 and 45, respectively, and adjusted to the proper setting before the main molding operation. As best shown in FIGS. 9 and 16–19, the plastic body 28 is molded on the frame in the mold cavity 54 defined between a first side mold member 55 and a second relatively movable side mold member 56, between which a pair of edge mold members 57 and 58 are also movable in and out as indicated by the arrows in FIG. 9. Side mold members 55 and 56 have opposed side face forming surfaces 55a, 56a and the edge mold members 57, 58 have edge face forming surfaces 57a, 58a. As shown in FIGS. 16–19, the side mold members 55 and 56 are conveniently hingedly interconnected by hinge pins 75 for relative swinging movement about an axis located medially between the side face forming surfaces 55a and 56a and offset from the mold cavity 54 so that the mold surfaces 55a and 56a are relatively movable in a direction laterally of opposed side faces of the metal frame 26 in the mold cavity. The edge mold members 57 and 58 are supported as by pins 76 slidable in guide 77 on one of the mold members 55 for movement relative to the mold members 55 and 56 in a direction generally paralleling the mold faces 55a, 56a so that the mold faces 57a and 58a are relatively movable in a direction laterally of opposed edge faces of the metal level frame 26 in the mold cavity. Levers 77 are provided to facilitate movement of the edge mold members into and out of engagement with the edges of the metal frame 26 and as shown in FIG. 18, the levers 77 are pivotally mounted on brackets 78 on one of the mold members 55 and connected by a link 79 to the pins 76. A mold clamp mechanism is provided for clamping the side mold members and the edge mold members against the metal level frame 26 and, as best shown in FIG. 18, the clamp mechanism includes clamp bars 81 extending laterally from the edge of the mold member 56 opposite the hinged edge, and a cam shaft 82 rotatably supported on links 83. The links 83 are swingably mounted by pins 84 on the mold member 55 to allow the cam shaft to be moved into and out of position over the cam bars 81 on the mold member 56, and a lever 85 (FIG. 16) is attached to the cam shaft 82 to enable rotation of the cam shaft relative the links 83. The cam shaft 82 has eccentric 82a engageable with the cam bars 81 to apply pressure to the cam bars and press the side mold members 55 and 56 against the rails 27 at opposite sides of the metal level frame 26. The edge mold members 57 and 58 are pressed against the rails at opposite edges of the metal level frame 26 by cam members 86 conveniently mounted on one side mold member 56 and which cam member engage cam faces 87 on the edge mold members 57 and 58.

The metal frame is positioned in the mold cavity and the mold member moved relative to each other and relative to the frame to press the side face forming surfaces 55a, 56a on mold members 55 and 56 against the outer faces 27a of the rails 27 and to press the edge face forming surfaces 57a, 58a against the outer faces 27b of the rails 27 so that the rails on the metal frame limit inward movement of the mold members and control the size of the mold cavity and the relative parallelism of the mold surface on the side and edge mold members. As shown in FIGS. 18 and 19, the side face forming surfaces 55a, 56a and the edge face forming surfaces 57a, 58a are preferably formed of a resilient mold making material such as silicone rubber, and the cams 82 and 86 are adjusted such that the side and edge face forming surfaces are pressed against the outer faces of the rails with sufficient pressure to compress the portions that engage the rails and offset the portions of the face forming surfaces intermediate the rails slightly inwardly of the respective rails. The resilient side and edge forming surfaces 55a, 56a and 57a, 58a are also preferably textured, as by being molded against a wood member, to reproduce a wood grain effect on the plastic body 28.

The resilient end caps 29 are positioned at opposite ends of the mold cavity to close the ends of the cavity. As best shown in FIGS. 16 and 17, end mold members 88 are provided for holding the resilient end caps 29 on the ends of the metal level frame 26 and to seal the ends of the mold cavity. For this purpose, the end mold members are also provided with a mold face 88a of resilient material such as silicone rubber and the end mold members are contoured to receive the end caps 29 and to also sealingly engage the ends of the side and end mold members 55–58. Clamp assemblies 91 of any suitable construction are provided for releasably clamping the end mold members in position closing the ends of the mold.

The hand openings 50 in the level body are advantageously formed during molding of the plastic body and as best shown in FIG. 19, bosses 55b and 56b are formed on the mold members 55 and 56 and are shaped to form the elongated hand openings 50 in the plastic body. The bosses 55b and 56b are also preferably formed of the resilient mold making material as used in the side face forming surfaces 55a, 56a and the bosses engage on a parting line medially between the faces 55a, 56a. As will be apparent, bosses 55b, 56b engage when the mold members 55 and 56 are closed and the resilient bosses can compress if required to allow the side face forming surfaces to engage the rails. As shown, the bosses 55b, 56b register with and are somewhat smaller than the corresponding openings 50a in the web structure of the metal level frame 26 so that the plastic body 25 extends through the openings 50a to seal the web structure in this area and join the sections of the plastic body in opposite sides of the frame.

In the embodiment of FIGS. 1–8, the plastic level vials are mounted in holders 36, 42 on the metal level frame. The holders define generally annular holder frames having end faces paralleling the sides of the level body and bosses 55c 56c, also of resilient mold making material are provided on the mold members to sealingly engage the ends of the vial holder frames as best shown in FIGS. 9 and 18.

The plastic material for forming the rigid foamed plastic body 28 is introduced into the mold cavity from one side or from one end, before the closing of that side or end of the cavity, or the material can be injected into a closed mold. The plastic material is preferably a high density rigid urethane foam reaction mixture such as the so called furniture grades used for making plastic furniture. The foam reaction mixture is selected to have a free rise density somewhat less than final density desired for the plastic body 28 and the charge of the foamable material utilized for each molding operation is made somewhat greater than that necessary to fill the mold cavity under free rise conditions so that a positive pressure is built up in the mold by the expending resin to completely fill all voids in the mold cavity and to compress the cell structure at the outer surfaces of plastic body into a generally non-porous skin integral with the foamed core. Preferably, the molding operation is conducted with the mold in an upright condition and the charge of flowable plastic is introduced into the upper end before applying the upper end cap 29. The urethane foam molding process can be carried out at a low temperature and thus will not damage the glass level vials included in the preliminary assembly. It requires only a matter of a few minutes for the rigid urethane foam reaction mixture to solidify, whether it is poured in an open mold or injected in a closed mold and the level body can be removed from the mold as soon as the plastic sets. The windows 48 and 49 are preferably glued in place as the final step in the assembling of the levels.

FIGS. 10 and 11 show a variation in construction in which the vials and vial holders are assembled in the level after the molding operation is completed, this level 25' being otherwise similar to the level 25 of FIGS. 1–8 except for the fact that the metal frame 26' happens to be of two-piece construction split through the center line thereof as seen at 50' in FIGS. 11 and 12, the two halves being fastened together by twist tabs 51 provided on tie plates 51' disposed in uniformly longitudinally spaced relationship along the two halves of the frame and which tabs when extended through slots and bent serve to secure the two halves of the frame in rigidly assembled relationship prior to the molding operation. Then in the molding of the rigid foamed urethane body material 52', circular openings 53' can be cored in the body for each of the vials 54', 55' and 56', disposed vertically, horizontally, and at a 45° angle, respectively, as shown. Alternatively, the openings 53' can be cut or milled into the body after the plastic hardens. Each of these vials is conveniently molded in a urethane ring or holder 57', and the holder then pressed or glued in the cored openings 53'. Plastic molded rings 58' are assembled inside the urethane rings 57' from opposite sides of the vial 55', and circular windows 59' are assembled in the annular shoulders 60' to enclose the vial 55' from opposite sides for good visivility and finally, plastic rings 61' are cemented in place around the windows 59' to complete the assembly, resulting in a construction closely similar to that of FIGS. 1–8 and which can be molded in a manner similar to that described in connection with FIGS. 1–9 and 15–19.

The levels 25' and 25" offer practically the same advantages as the levels 25 at very little difference in cost.

The level 25", shown in FIGS. 13 and 14, is another form in which the metal frame 25" has a plastic body 52" preferably of high density rigid foamed urethane molded therein in the same manner as in level 25 of FIGS. 1–9 and the level 25' of FIGS. 10–12. In this embodiment, openings 53" for the vials 55" cored or otherwise formed in the plastic, and the vials are mounted in the openings 53" after the plastic is molded on the frame. The vials can be cast in plastic holders 57" and the holders and vials finally set and accurately calibrated when assembled in the openings 53" or the vials can be positioned in the openings 53" and set by cement, plastic or the like.

The composite metal and plastic level of the present invention offers many advantages over either the prior all wood levels or the prior all metal levels. The composite metal and plastic level is more economical to manufacture and is not subject to warping due to moisture as in the case of all wood levels. On the other hand, the foamed plastic on the metal frame substantially encloses and supports the flanges of the metal frame. This not only provides a level body with the generally rectangular shape and feel of wood level, but also reduces the damage of bending or deforming the level due to impact. Moreover, the plastic provides good thermal insulation so that the level is comfortable to handle even in cold weather. The outer faces of the plastic are offset from the outer faces of the rails so that the latter define accurate work engaging surfaces and protect the plastic from wear.

In each of the several forms of frame illustrated, the vials can be mounted with their holders on the frame prior to molding of the plastic on the frame as disclosed in the embodiment of FIGS. 1–8 or the vials and their holders may be assembled in openings cored or otherwise formed in the plastic body of the level after the plastic is molded on the frame in the manner similar to that shown in FIGS. 11 and 14.

The metal frame 26 is formed prior to the molding operation with straight and accurately parallel rails and, since the side and edge mold members are pressed against the rails, the metal frame controls the size of the mold cavity and the relatively parallel relationship between the side and edge forming surfaces of the mold members. The mold members also seal the outer faces of the rails from the mold cavity so that the outer faces of the rails are exposed and advantageously offset above the plastic on the resulting composite metal and plastic level body to provide accurately parallel work engaging surfaces. Thus, the accuracy of the level is not effected by any non-uniform shrinkage or distortion of the plastic that might occur during or subsequent to the molding operation or during use.

It is believed the foregoing description conveys a good understanding of the objects and advantages of my invention. While preferred embodiments of the invention have been illustrated and described, this is only for the purpose of illustration, and it is to be understood that various modifications in structure will occur to a person skilled in this art.

The embodiments of the invention in which an exclusive property or privilege is claimed are defined as follows:

1. A method of making a spirit level having an elongated level body of generally rectangular cross section with a pair of relatively parallel edge faces and a pair of relatively parallel side faces comprising: forming an elongated metal frame having four relatively parallel rails arranged in a transversely rectangular array to extend along the four lengthwise extending corners of the level body and internal web portions rigidly interconnecting the rail portions and spaced inwardly of the rectangular array to define a longitudinal channel at each of the four sides of the array, providing a first pair of mold members having opposed edge face forming surfaces and relatively moving the first pair of mold members in a direction laterally of one pair of relatively parallel sides of the array until the edge face forming surfaces are firmly pressed against the rails at said one pair of relatively parallel sides of the rectangular array and close the outer side of channels thereat, providing a second pair of mold members having opposed side face forming surfaces and relatively moving said second pair of mold members in a direction laterally of the other pair of relatively parallel sides of the rectangular array until the side face forming surfaces are firmly pressed against the rails at said other pair of relatively parallel sides of the rectangular array and close the outer sides of channels thereat and form a mold cavity around the frame, introducing a flowable plastic material into the channels of the type hardenable to form a rigid plastic body, allowing the plastic material to harden in the channels to form a rigid plastic body on the metal frame, and separating the mold members from the composite metal frame and rigid plastic body to provide an elongated level body with the outer faces of the four rails exposed at its four lengthwise corners to provide accurate level surfaces, and mounting level vials on said level body.

2. A method of making a spirit level according to claim 1 including forming said opposed edge face forming surfaces on said first pair of mold members of a resilient mold making material, and pressing said edge face forming surfaces against the rails at said one pair of opposed sides of the rectangular array with sufficient pressure to compress the portions of the edge face forming surfaces that engage the rails and offset the portion of the edge face forming surfaces intermediate the rails slightly inwardly of the outer faces of the respective rails.

3. A method of making a spirit level according to claim 1 including forming opposed edge face forming surfaces on said first pair of mold members of a resilient mold making material with a surface configuration to reproduce a wood grain, and pressing said edge face forming surfaces against the rails at said one pair of opposed sides of the rectangular array with sufficient pressure to compress the portions of the edge face forming surfaces that engage the rails and offset the portion of the edge face forming surfaces intermediate the rails slightly inwardly of the outer faces of the respective rails.

4. A method of making a spirit level according to claim 1 including forming said opposed edge face forming surfaces on said first pair of mold members and said opposed side face forming surfaces on said second pair of mold members of a resilient mold making material and pressing the same against the rails at the respective sides of the rectangular array with sufficient pressure to compress the portions that engage the rails and to offset the portions intermediate the rails slightly inwardly of the outer faces of the respective rails.

5. A method of making a spirit level according to claim 1 wherein said flowable plastic material is foamable to form a foamed rigid plastic body having a density in a range of about 20 to 30 pounds per cubic foot.

6. A method of making an elongated generally rectangular level body according to claim 1 wherein said flowable plastic material is a high density rigid urethane foam resin mixture.

7. A method of making an elongated generally rectangular level body according to claim 1 including providing bumper pads of resilient material having a rectangular configuration corresponding to the cross-section of said rectangular array, and positioning one bumper pad on each end of said metal frame prior to hardening of the plastic material on the frame to mold the plastic material to the bumper pads.

8. A method of making a spirit level according to claim 1 including forming openings in the frame interconnecting the channels at spaced locations along the frame prior to forming the plastic body on the frame to allow free flow of the flowable plastic material between the channels during forming of the plastic body on the frame.

9. A method of making a spirit level according to claim 1 wherein the flowable plastic material is a charge of high density rigid urethane foam reaction mixture having a density of about 20 to 30 pounds per cubic foot and a free rise volume greater than the volume of the mold cavity to form a foamed plastic body having a relatively dense integral skin.

10. A method of making a spirit level according to claim 9 wherein the flowable plastic material is introduced into the mold cavity while the mold cavity is in a generally upright condition.

11. The method of making a spirit level according to claim 1 wherein the level vials are mounted on the web portion of the metal frame prior to forming of the rigid plastic body on the metal frame.

12. The method of making a spirit level according to claim 1 wherein the level vials are mounted on the level body after forming the rigid plastic body on the metal frame.

13. A method of making a spirit level according to claim 1 including forming at least one opening in the internal web structure of said metal frame of a size larger than the level vial prior to formation of said rigid plastic body on the frame, mounting the level vial in a vial holder frame and mounting the vial holder frame in said one opening in the web structure prior to formation of said rigid plastic body on the metal frame, and sealing opposite ends of the vial holder frame from the mold cavity during molding of the plastic body to form the body clear of the level vial.

14. A method of making an elongated generally rectangular level body according to claim 2 including forming at least one large opening in said internal web structure of the metal frame prior to forming the plastic body on the frame, and providing resilient bosses on said opposed side forming surface shaped and arranged to project through said one opening in said web structure of the metal frame and into engagement with each other to form a hand opening through the level body.

15. A method of making a spirit level having an elongated metal body of generally rectangular cross section with a pair of relatively parallel edge faces and a pair of relatively parallel side faces comprising: forming an elongated metal frame having four relatively parallel rails arranged in a transversely rectangular array and web structure rigidly interconnecting the rails and defining channels at least at opposite sides of the array, forming openings in the web structure between said channels, providing a pair of mold members having opposed side face forming surfaces of a resilient mold making material, and pressing said side face forming surfaces against the rails at relatively opposite sides of said rectangular array with sufficient pressure to compress the portions of the side face forming surfaces that engage the rails and offset the portion of the side face forming surfaces intermediate the rails slightly inwardly of the outer faces of the rails, introducing a quantity of rigid urethane foam reaction mixture into the channels having a free rise volume greater than the volume of the channels and a density in a range of about 20 to 30 pounds per cubic foot, allowing the reaction mixture to expand and set in the channel to form a rigid foamed plastic body on the metal frame, separating the mold members from the composite metal frame and rigid plastic body to provide an elongated level body with the outer faces of the rails exposed and with the outer faces of plastic in the channels offset slightly inwardly from the outer faces of the rails, and mounting level vials in said level body.

* * * * *